(12) United States Patent
Pike

(10) Patent No.: US 10,341,349 B2
(45) Date of Patent: Jul. 2, 2019

(54) SESSION SECURITY SPLITTING AND APPLICATION PROFILER

(71) Applicant: Cyemptive Technologies, Inc., Woodinville, WA (US)

(72) Inventor: Robert Pike, Woodinville, WA (US)

(73) Assignee: Cyemptive Technologies, Inc., Snohomish, WA (US)

(*) Notice: Subject to any disclaimer, the term of this patent is extended or adjusted under 35 U.S.C. 154(b) by 0 days.

(21) Appl. No.: 15/438,192

(22) Filed: Feb. 21, 2017

(65) Prior Publication Data

US 2017/0163658 A1  Jun. 8, 2017

Related U.S. Application Data

(63) Continuation of application No. 14/827,230, filed on Aug. 14, 2015, now Pat. No. 9,614,853.

(Continued)

(51) Int. Cl.
*H04L 29/06* (2006.01)
*G06F 21/57* (2013.01)

(Continued)

(52) U.S. Cl.
CPC ............ *H04L 63/10* (2013.01); *G06F 9/5077* (2013.01); *G06F 21/57* (2013.01); *G06F 21/6218* (2013.01); *H04L 63/0846* (2013.01); *H04L 63/102* (2013.01); *H04L 63/108* (2013.01); *H04L 63/1408* (2013.01); *H04L 63/1416* (2013.01); *H04L 63/1425* (2013.01); *H04L 63/1441* (2013.01); *H04L 63/1466* (2013.01);

(Continued)

(58) Field of Classification Search
CPC .... H04L 63/10; H04L 63/102; H04L 63/1408
See application file for complete search history.

(56) References Cited

U.S. PATENT DOCUMENTS 7,260,640 B1  8/2007 Kramer et al.
8,510,807 B1  8/2013 Elazary et al.
(Continued)

OTHER PUBLICATIONS

PCT International Search Report and Written Opinion, PCT Application No. PCT/US16/13944, dated Mar. 28, 2016, 15 pages.
(Continued)

*Primary Examiner* — Dao Q Ho
(74) *Attorney, Agent, or Firm* — Fenwick & West LLP

(57) ABSTRACT

Intelligent methods of providing online security against hackers, which prevents the hackers from obtaining unauthorized access to secure resources. A first application session established between a first client and a first application of a first host device is detected. The first application is associated with a first plurality of security time limits that divide security for the first application into security tiers. A duration of the first application session established between the first client and the first application is monitored. One or more first security actions are executed against the first application session responsive to the duration of the first application session reaching a security time limit of the first plurality of security time limits. One or more second security actions are executed against the first application session responsive to the duration of the first application session reaching another security time limit of the first plurality of security time limits.

18 Claims, 9 Drawing Sheets

Related U.S. Application Data

(60) Provisional application No. 62/105,685, filed on Jan. 20, 2015.

(51) Int. Cl.
    *G06F 21/62*         (2013.01)
    *H04L 29/08*        (2006.01)
    *G06F 9/50*          (2006.01)

(52) U.S. Cl.
    CPC ............ *H04L 63/20* (2013.01); *H04L 67/148* (2013.01); *H04L 63/0263* (2013.01); *H04L 67/42* (2013.01)

(56) References Cited

U.S. PATENT DOCUMENTS

| | | |
|---|---|---|
| 2002/0087994 A1 | 7/2002 | Gomez |
| 2002/0188706 A1 | 12/2002 | Richards et al. |
| 2003/0126202 A1 | 7/2003 | Watt |
| 2003/0208612 A1 | 11/2003 | Harris et al. |
| 2004/0103337 A1 | 5/2004 | Smith |
| 2004/0117622 A1 | 6/2004 | Marquet et al. |
| 2004/0255189 A1 | 12/2004 | Chu et al. |
| 2005/0188222 A1 | 8/2005 | Motsinger |
| 2007/0106798 A1 | 5/2007 | Masumitsu et al. |
| 2008/0046982 A1 | 2/2008 | Parkinson |
| 2008/0183975 A1 | 7/2008 | Foster et al. |
| 2008/0250419 A1 | 10/2008 | Kasten et al. |
| 2010/0274885 A1 | 10/2010 | Yoo et al. |
| 2010/0281102 A1 | 11/2010 | Chinta et al. |
| 2010/0306578 A1 | 12/2010 | Thornton et al. |
| 2011/0055921 A1 | 3/2011 | Narayanaswamy et al. |
| 2011/0238924 A1 | 9/2011 | Hampton et al. |
| 2011/0302653 A1 | 12/2011 | Frantz et al. |
| 2012/0209977 A1 | 8/2012 | Nakajo |
| 2012/0240185 A1* | 9/2012 | Kapoor ............... H04L 63/1425 726/1 |
| 2013/0111497 A1 | 5/2013 | Chen et al. |
| 2013/0238928 A1 | 9/2013 | Watanabe et al. |
| 2014/0108775 A1 | 4/2014 | Kludy et al. |
| 2016/0092308 A1 | 3/2016 | Bates |

OTHER PUBLICATIONS

PCT International Search Report and Written Opinion, PCT Application No. PCT/US16/13942, dated Apr. 19, 2016, 14 pages.
PCT/US16/13942, Apr. 19, 2016, 14 pages.
European Extended Search Report, European Application No. 16740599.2, dated Jul. 30, 2018, 8 pages.

\* cited by examiner

| Credit Card Application Session (or connection) | Security Tier A – Minimal Security Actions 202 | | | Security Tier B – Basic Security Actions 204 | | | Security Tier C – Inter. Security Actions 206 | | | Security Tier D – Adv. Security Actions 208 | | |
|---|---|---|---|---|---|---|---|---|---|---|---|---|
| | Stg 1 3 sec | Stg 2 3 sec | Stg 3 3 sec | Stg 4 3 sec | Stg 5 3 sec | Stg 6 3 sec | Stg 7 3 sec | Stg 8 3 sec | Stg 9 3 sec | Stg 10 3 sec | Stg 11 3 sec | Stg 12 3 sec |

| Web Application Form Session (or connection) | Security Tier A – Minimal Security Actions 202 | | | Security Tier B – Basic Security Actions 204 | | | Security Tier C – Inter. Security Actions 206 | | | Security Tier D – Adv. Security Actions 208 | | |
|---|---|---|---|---|---|---|---|---|---|---|---|---|
| | Stg 1 30 sec | Stg 2 30 sec | Stg 3 30 sec | Stg 4 30 sec | Stg 5 30 sec | Stg 6 30 sec | Stg 7 30 sec | Stg 8 30 sec | Stg 9 30 sec | Stg 10 30 sec | Stg 11 30 sec | Stg 12 30 sec |

| Online Banking Session (or connection) | Security Tier A – Minimal Security Actions 202 | | | Security Tier B – Basic Security Actions 204 | | | Security Tier C – Inter. Security Actions 206 | | | Security Tier D – Adv. Security Actions 208 | | |
|---|---|---|---|---|---|---|---|---|---|---|---|---|
| | Stg 1 3 min | Stg 2 3 min | Stg 3 3 min | Stg 4 3 min | Stg 5 3 min | Stg 6 3 min | Stg 7 3 min | Stg 8 3 min | Stg 9 3 min | Stg 10 3 min | Stg 11 3 min | Stg 12 3 min |

FIG. 3

SESSION SECURITY SPLITTING AND APPLICATION PROFILER

CROSS REFERENCE TO RELATED APPLICATIONS

This application is a continuation of U.S. patent application Ser. No. 14/827,230, filed on Aug. 14, 2015, which claims priority from U.S. Provisional Patent Application No. 62/105,685, filed on Jan. 20, 2015, the contents of which are incorporated by reference in their entirety.

BACKGROUND

1. Field of the Invention

The present disclosure relates to computer security against unauthorized access to resources, and more specifically to profiling applications and splitting sessions and connections of those applications into security tiers.

2. Field of the Invention

In network communications there are many forms of software and hardware security, including firewalls and intrusion detection and prevention systems. But they all fault on one core issue, that if rules are not applied correctly they can open opportunities for unauthorized access. Operating Systems and Applications today also have many bugs which if exposed to the internet, can enable remote access to servers hosting the applications.

Existing firewalls support packet inspection. The inspection is based on rules applied to a configuration in a firewall and have limitations on active learning because they are not capable of talking to the application stack and the application stack having limited capabilities to talk to the security stack. The firewalls normally try and reduce the number of rules because it creates a huge overhead on every connection to a host and at scale can cause problems if too many rules are applied.

SUMMARY

Embodiments of the present disclosure include intelligent methods of providing online security against hackers, which prevents the hackers from obtaining unauthorized access to secure resources. In one embodiment, a method of security against unauthorized access to resources is disclosed. A first application session established between a first client and a first application of a first host device is detected. The first application is associated with a first plurality of security time limits that divide security for the first application into security tiers. A duration of the first application session established between the first client and the first application is monitored. One or more first security actions are executed against the first application session responsive to the duration of the first application session reaching a security time limit of the first plurality of security time limits. One or more second security actions are executed against the first application session responsive to the duration of the first application session reaching another security time limit of the first plurality of security time limits.

In one embodiment, the security time limits are established through a machine learning process. The process can include monitoring durations of a plurality of previous application sessions corresponding to the first application to generate first session duration data. The first plurality of security time limits are then determined based on the first session duration data for the plurality of previous application sessions.

In one embodiment, the method further comprises: detecting a second application session established between a second client and a second application of the at least one server, the second application associated with a second plurality of security time limits that divide security for the second application into security tiers; monitoring a duration of the second application session established between the second client and the second application; executing the one or more first security actions against the second application session responsive to the duration of the second application session reaching a security time limit of the plurality of security time limits; and executing the one or more second security actions against the second application session responsive to the duration of the second application session reaching another security time limit of the plurality of security time limits.

In one embodiment, one of the first security actions or the second security actions include at least one of: IP lookups, deep packet inspection, malformed packet detection, or enabling honeypot security sensors. In one embodiment, one of the first security actions or the second security actions include isolating the first application session from other application sessions associated with the at least one host device. Isolating the first application session can comprise moving the first application session to a second host device. Isolating the first application session can also comprise maintaining the first application session on the first host device and preventing the other application sessions from being established with the first host device.

In one embodiment, the method of online security can also be applied to connections established for the application sessions. Other embodiments include a non-transitory computer readable medium storing instructions. The instructions are executable by at least one processor to implement operations for preventing unauthorized access to resources.

BRIEF DESCRIPTION OF THE DRAWINGS

FIG. 3 is a diagram of application sessions/connections for different applications that are split into different security tiers, according to an embodiment.

DETAILED DESCRIPTION

Reference will now be made in detail to several embodiments of the present disclosure, examples of which are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

The future of securing online applications is based on machine level learning of security and allowing the security system to profile average application session flows. The average application session flows can change triggering points of a multi stage triggering session. The longer a session goes on, the higher the risk that the session has been comprised. Embodiments of the present disclosure will profile a session, and depending on the time or state, will initiate security actions, such as by analyzing the session for abnormal packet flows or duplicating the packet flows for playback in a controlled analytics security sandbox.

Embodiments of the present disclosure relate to a component of a security system platform that profiles applications to prevent hackers from getting access to backend datasets and preventing ongoing access to any dataset. Embodiments of the preset disclosure also split various application sessions found in applications and networks into security tiers/segments within a single session, and increases the security level for each security tier/segment over time. More particularly, embodiments of the present disclosure can prevent access to unauthorized resources through the use of escalating security levels for a higher security solution. Embodiments of the present disclosure can also split connections into security tiers and increase the security level for each security tier over time.

Figure 1:
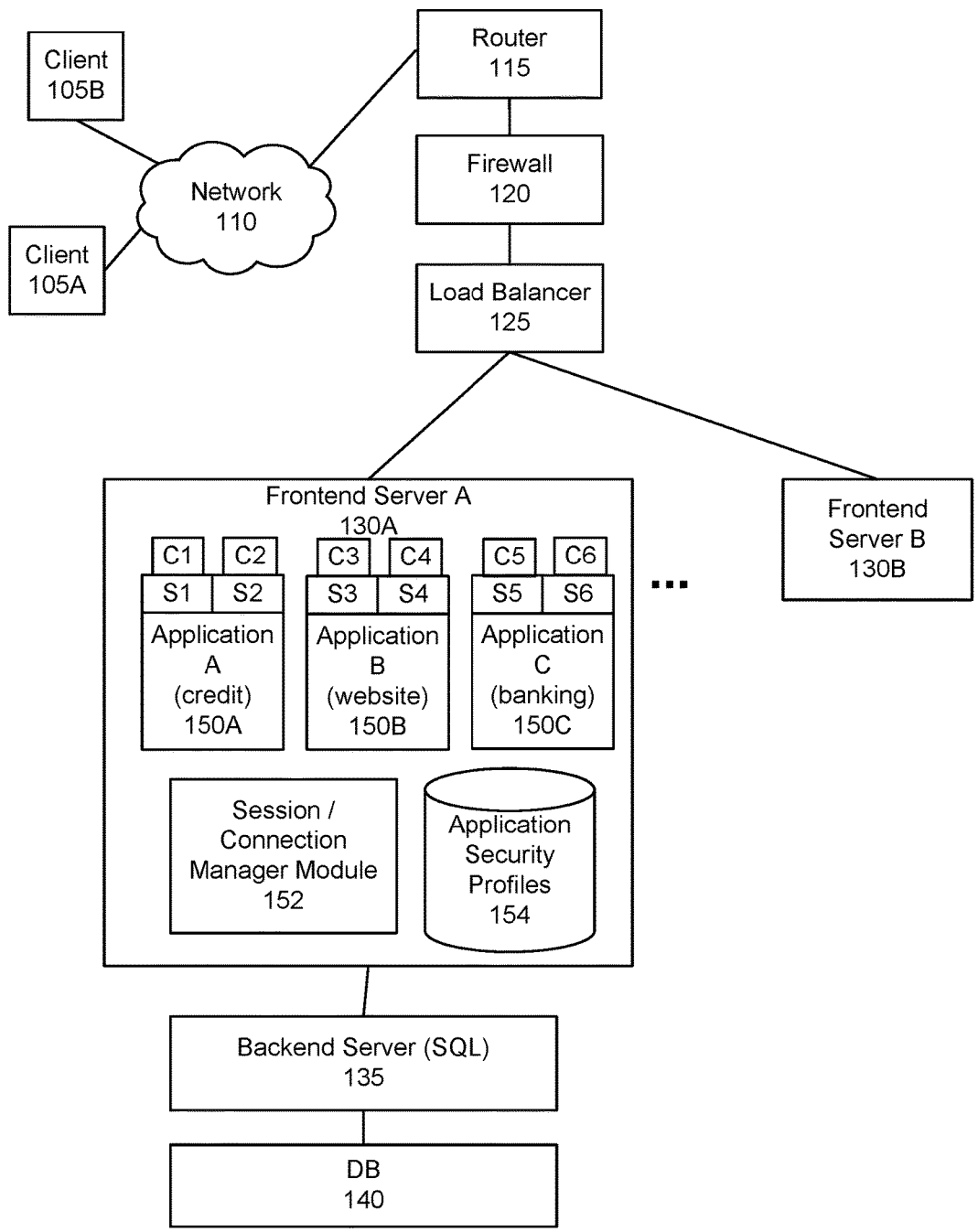
FIG. 1 is a block diagram of networked communication system with session/connection splitting, according to an embodiment.

FIG. 1 is a block diagram of networked communication system with session and connection splitting security, according to an embodiment. The system includes several client devices 105, a network 110, a router 115, firewall 120, load balancer 125, frontend servers 130, backend server 135, and database 140. Computing devices such as the router 115, firewall 120, load balancer 125, frontend server 130, backend server 135, and database 140 may form a datacenter that is accessed by the clients 105 via the network 110. Only two clients 105 and two frontend servers 130 are shown in FIG. 1 for ease of illustration. In other embodiments there may be a larger number of client devices 105 and frontend servers 130.

Client devices 105 can be computing devices, such as smartphones, tablet computers laptop computers and desktop computers, among others. A user interacts with software of the client devices 105 through an interface, such as a touchscreen or mouse and keyboard. The client devices 105 are controlled by the user to establish application sessions and connections with various applications hosted by the frontend servers 130.

Frontend servers 130 are server class computing device that can include one or more processors and executes an operating system. The servers 130 host several software applications 150, and may also be referred to herein as a host device. For example, the applications 150 can host a credit card payment application 150A, a website 150B, and an online banking application 150C. Other examples of host devices that host applications 150 may be general electronics, phones, tablets, flight control systems in planes, etc.

The client devices 105 can establish networking connections C1-C6 with the applications 150 via the network 110, router 115, firewall, and load balancer 125. A connection is used as a bidirectional communication channel between sockets at the client devices 105 and the servers 150. The connection is established at a certain point in time, such as using a handshake or sometimes no handshake process, and then terminated at a later point in time. The connection may include several states defined by a protocol. One type of connection example is a transmission control protocol (TCP) connection under the transport layer of the Open Systems Interconnect (OSI) model.

The client devices 105 also establish application sessions S1-S6 with the applications 150 over the connections C1-C6. An application session is an interactive information exchange between two or more communicating entities for a given application. The application session is established at a certain point in time, and then terminated at a later point in time. During the application session, one or more messages requesting information or responding to requests may be sent in each direction over a connection that has been established for the session. State (e.g. logged in, logged out, idle, uploading, downloading, searching, manipulating or updating existing data, corrupting or removing data, trigger alarms, time counter state, key match, key changed, risk factor state) for the session may be maintained by either the frontend server 130A or the clients 105. In one embodiment, the application sessions are sessions of the OSI session layer that sit above the transport layer. Examples of sessions can be HTTP sessions, FTP sessions, and SMTP sessions, among others.

In one example, a credit card authentication session (e.g. S1, S2) can be initiated when a user swipes a credit card at a client device 105A, and the client device 105A establishes a connection and session with credit card payment application 150A. Credit card payment application 150A communicates with the client device 105A to obtain the credit card number and charge amount from the client device 105A. The credit card payment application 150A then accesses the database 140 via backend server 135 to determine if the credit card number has sufficient credit to process the payment. The credit card payment application 150A then provides a yes/no response to the client device 105A. The connection and session are then terminated after providing the response to the client device 105A.

In another example, a web form session (e.g. S3, S4) can be initiated when a user enters a URL into a browser at a client 105B. The client device 105B establishes a session with website 150B. The frontend server 130A (i.e. webserver) may be processing multiple sessions. The frontend server 130A starts a time counter per session. The user has x amount of time to fill out a form before the session closes. A different front end server 130B may process the form submission from the initial session due to the time it takes to fill out the web form data.

In a further example, an online banking session (e.g. S5, S6) can be initiated when a user opens a mobile banking application at the client device 105B, and the client device 105B establishes a connection and session with online banking application 150C. Online banking application 150C communicates with the client device 105C to obtain authentication information from the client device 105C. Once authenticated, the client device 105C can request account balances, upload copies of checks for deposit, and make other banking requests. The banking application 150C can access account information stored in database 140 via backend server 135 to process these requests.

Backend server 135 provides access to data stored in database 140. Any of the applications 150 may request data from the backend server 135, which then retrieves the data from the database 140 and provides the data to the application 150. An example of a backend server 135 is a SQL server. Hackers often attempt to gain access to the data in the database 140 through hacked sessions or connections, and the session/connection manager module 152 attempts to detect these hacked sessions and connections before they successfully access the data. In the case of hijacked sessions, a hacker will be extending the timeline of the session and this is where the risk factor increases and the session/connection manger module 152 can increase security and trigger alerts.

Session/connection manager module 152 provides security against hacked session/connections. For each session/connection, the session/connection manager module 152 divides the session/connection into different time triggered security tiers. By forcing sessions/connections to be split by time into security tiers, different actions can be triggered based on the split tiers of a single session/connection. In each tier, the session/connection manger module 152 applies one or more security actions to the session/connection. In one embodiment, a security action is applied against a session/connection by executing software program code for the security action on a processing unit (e.g., a processor or controller or custom application specific integrated circuit).

Security actions can be actions designed to detect a hacker or to prevent a hacker from successfully completing a hack by analyzing data from the session. Examples of security actions can include IP lookups, activating honeypot sensors, session/connection isolation, deep packet inspection, containing sessions/connections, security alerting, session/connection tracing, session/connection recording, applying machine learning to sessions/connections and full control/alerting and terminating sessions/connections. Earlier security tiers may include different rules and could be configured to have little to no security actions to reduce the false positives, while later security tiers may include more resource intensive security actions. In later security tiers, the session/connection manger module 152 can notify the other devices such as the router 115, firewall 120 or load balancer 125 of a high risk security session/connection and cause the other devices to apply security actions to the session/connection.

The session/connection manger module 152 monitors the duration of a session/connection, and then advances security from one security tier to the next once the session/connection duration reaches certain security time limits. Most normal sessions/connections are expected to complete before reaching the security time limits. Only hacked sessions/connections are expected to exceed the security time limits. The more resource intensive security actions are thus applied only to sessions/connections that are at higher risk of being hacked sessions. As a result, increasing the security tiers over time has a technical advantage of improving the functioning of the frontend servers 130 by reducing the computing load on the computing hardware, such as processor and memory, of the frontend servers 130 by methodically and increasing security tiers within particular time periods of a session while still maintaining a high level of security against hackers.

Having different security actions in different time intervals also enables tools to understand what is a normal session and what is a hacked session and terminate, track, trace, record, escalate, analyze, the state of the session accordingly. Additionally, the connection and session are eventually terminated at the end of the session based on a hacker leaving or being forced to leave. When a hacker returns, certain fingerprint data profiled from the hacker's previous hack attempts can be used to identifier the hacker and immediately escalate a risk level, which triggers recording or applying more security sensors while the system learns how the hacker is attempting to escalate his access privileges to the host or backend system. Once connected sessions states are removed/terminated, the machine learning can self correct the hole that was found and terminate the session to keep the hacker out.

The security time limits may be different for each type of application 150. In one embodiment, the session/connection manager module 152 determines the security time limits separately for each application via a machine learning process. The learning process monitors previous session/connection durations for an application, generates session/connection duration data from the session/connection durations, and stores the session/connection duration data into application security profiles in an application security profiles database 154. The security time limits for an application's sessions/connections can then be determined from the session/connection duration data in the application security profile for the application, which results in security time limits that are optimally tailored for each application 150. In other embodiment, hacked session time limits can be extended for further machine learning depending on end user risk factors and configuration.

The network 110 represents the communication pathways between the clients 105 and the router 115. Network 110 can include wired networks, wireless networks, or a combination of wired and wireless networks. Router 110 is a networking device that routes data packets between network 110 and firewall 120. Firewall 120 may filter data traffic and block certain data packets if they do not meet the firewall rules. Load balancer 125 distributes application traffic across a large number of servers 130.

In one embodiment, session/connection manager model 152 may be implemented as software instructions, hardware logic, or a combination of software and hardware. In one embodiment, the session/connection manager module 152 can be located elsewhere in the system, such as in the router 115, firewall 120, load balancer 125, or backend server 135. In other embodiments, the functions of the session/connection manager module 152 can be distributed across several computing devices.

Figure 2:
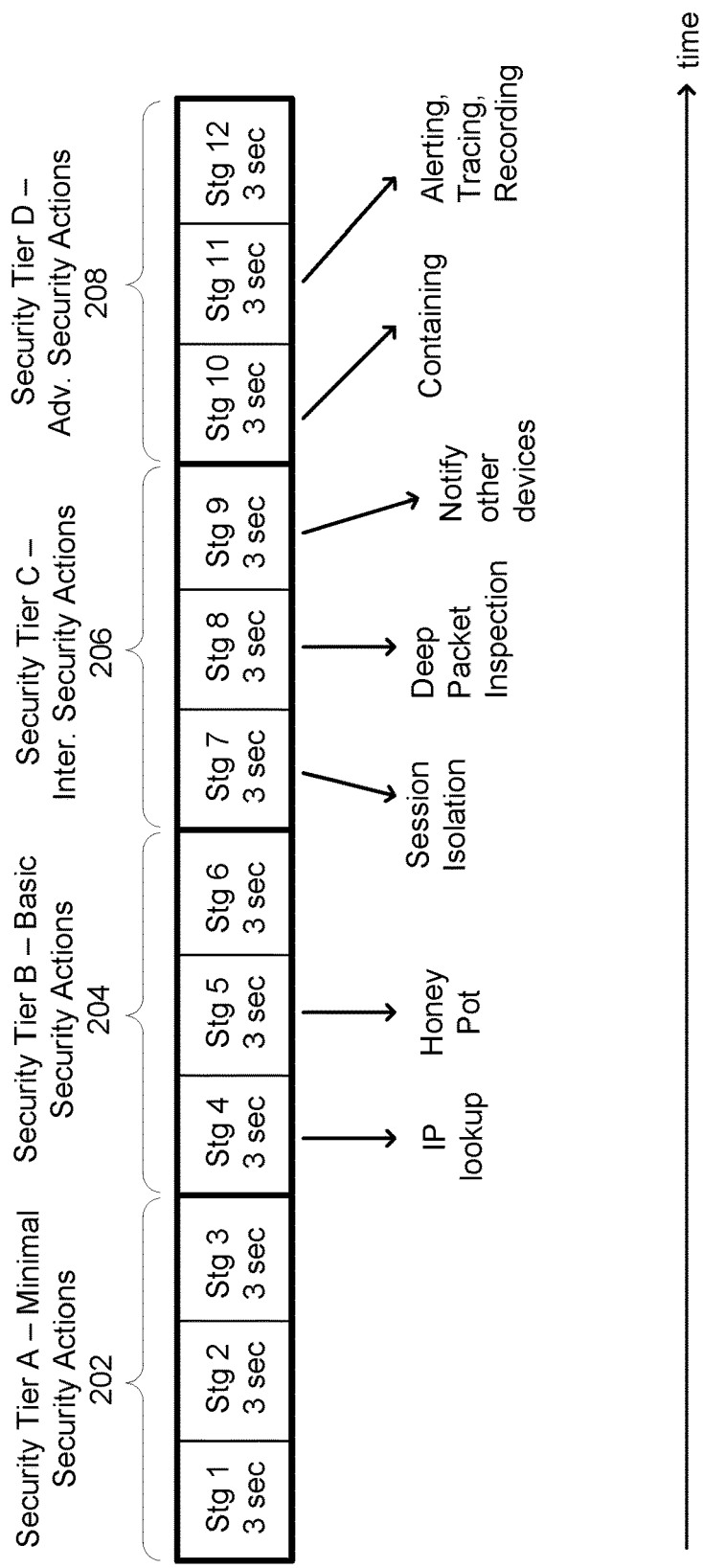
FIG. 2 is a diagram of an application session/connection that is split into different security tiers, according to an embodiment.

Turning now to FIG. 2, illustrated is an application session or connection divided into different security tiers, according to an embodiment. The session/connection of FIG. 2 is split into four security tiers: security tier A 202, security tier B 204, security tier C 206 and security tier D 208. Each security tier represents a higher level of security that is applied to the session/connection as the length of the session/connection increases. Each successive security tier is triggered by the duration of the application session/connection reaching a different security time limit. Each security tier includes several security stages (i.e. security sub-tiers) during which specific security actions are performed. Generally speaking, the state of the session/connection has different stages and the increased security of the session/connection increases and different rules and security actions apply as time passes.

Security tier A 202 is 9 seconds long. A minimal number of security actions (e.g. no security actions or few security actions) are applied to the session/connection during security tier A 202. Security actions are not generally needed during security tier A 202 because most normal application sessions/connections are expected to terminate before the end of security tier A 202.

Once the session/connection reaches the 9 second time limit of security tier A, the security level is increased from security Tier A 202 to Security Tier B 204. Security tier B 204 is 9 seconds long and basic security actions are applied to the application session/connection during security tier B 204. For example, during stage 4 of security tier B, the IP address of the client device 105 can be looked up to determine if the address is a suspicious address. The IP address may be suspicious if it originates from certain countries or if the IP address is a proxy server or predetermined factor analytics results in the IP being flagged as suspicious. If the IP address is suspicious, the security level may be immediately elevated to security tier C 206 while skipping any security actions in security stages 5 and 6.

As another example, during stage 5 of security tier B, honeypot security sensors can be activated. Honeypot security sensors are attached to file folders that contain fake data and not real data. The folders with fake data can have security sensors attached to them that generate a security alert when files in the folder are accessed or the folder is opened. For example, a directory structure can include the folders "/home/user1/" "/home/user2/" "/home/user3/". Real data is stored only in the /home/user3/folder but not the /home/user1/ or /home/user2/directories. A hacker accessing the directory tree does not know which directory contains real data and which directories are include fake data. Thus, the hacker will likely open the honeypot folder during the session/connection and trigger the honeypot security sensor.

Once the session/connection reaches the 9 second time limit of security tier B 204 (i.e. 18 second time limit from beginning of the session/connection), the security level is increased from Security Tier B 204 to Security Tier C 206. Security tier C 206 is 9 seconds long and intermediate security actions are applied to the application session/connection during security tier C 206. For example, during stage 7 of security tier C 206, the application session/connection can be isolated from other application sessions. Session/connection isolation will be later explained by reference to FIGS. 4 and 5.

As another example, during stage 8 of security tier C 206, deep packet inspection can be performed on data packets of the application session/connection to determine if the data packets are suspicious. Data packets can be suspicious if they are determined to include protocol anomalies, SQL injections, or are malformed packets.

As another example, during stage 9 of security tier C, the other network devices (e.g. the router 115, firewall 120 or load balancer 125) can be notified of the high risk session. The other network devices can then initiate their own analysis of data for the high risk session and provide this information back to the session/connection manager module 152.

Once the session/connection reaches the 9 second time limit of security tier C 206 (i.e. 27 second time limit from beginning of the session/connection), the security level is increased from security Tier C 206 to Security Tier D 208. Security tier D 208 is 9 seconds long and advanced security actions are applied to the application session/connection during security tier D 208. For example, during stage 10 of security tier C 206, the application session/connection can be contained, which cuts off access to real data and only allows access to fake data. During stage 11 of security tier 206, alerting, tracing and recording can be performed. Alerting involves notifying a network administrator of a potentially hacked session such as through email or SMS text. Tracing involves tracing the flow of actions performed during the application session, such as the order in which file directories were accessed during the application session. Recording involves storing the data captured during tracing for later offline analysis by $3^{rd}$ party tools for further investigation. The session/connection can also be terminated at the end of stage 12.

The security tiers and stages are all shown to have the same duration in FIG. 2. In other embodiments the security tiers and stages can have different durations. Only a few security actions for a few security stages are shown in FIG. 2, but other security actions now shown in FIG. 2 can also be performed during the other security stages. Additionally, the security actions may be applied in a different order and during different security stages than that shown in FIG. 2.

Additionally, splitting security into security tiers over time does not necessarily prevent the session/connection manager module 152 from running high security all the time. Different sets of security rules may simply be applied during different security tiers 202, 204, 206 and 208. This prevents false positives while also allowing computing resources to be focused on hacked sessions/connections which typically last longer than non-hacked sessions/connections. For example, security tier B 204 may also include a set of rules that applies deep packet inspection, but only if the IP lookup indicates the IP is a suspicious IP.

FIG. 3 is a diagram of application sessions/connections for different applications that are split into different security tiers, according to an embodiment. The lengths of the security tiers vary depending on the type of application. For a credit card processing application 150A, the security tiers may be 9 seconds long and each security stage is 3 seconds long. For a web application 150B, the security tiers may be 90 seconds long and each security stage is 30 seconds long. For an online banking application 150C, the security tiers may be 9 minutes long and each security stage is 3 minutes long.

Referring to the credit card example, a normal functioning credit card processing application 150A would normally process a transaction within 5-10 seconds and give a credit answer of approved or denied by 5-10 seconds. Embodiments of the present disclosure profiles the application 150A for the average credit card transaction and figures out time based session/connection time limits for the system from the average credit card transaction time.

The security actions performed in the security tiers can be the same across applications regardless of the application. For example, IP lookups can occur during security tier B 204 for all three applications.

Figure 4:
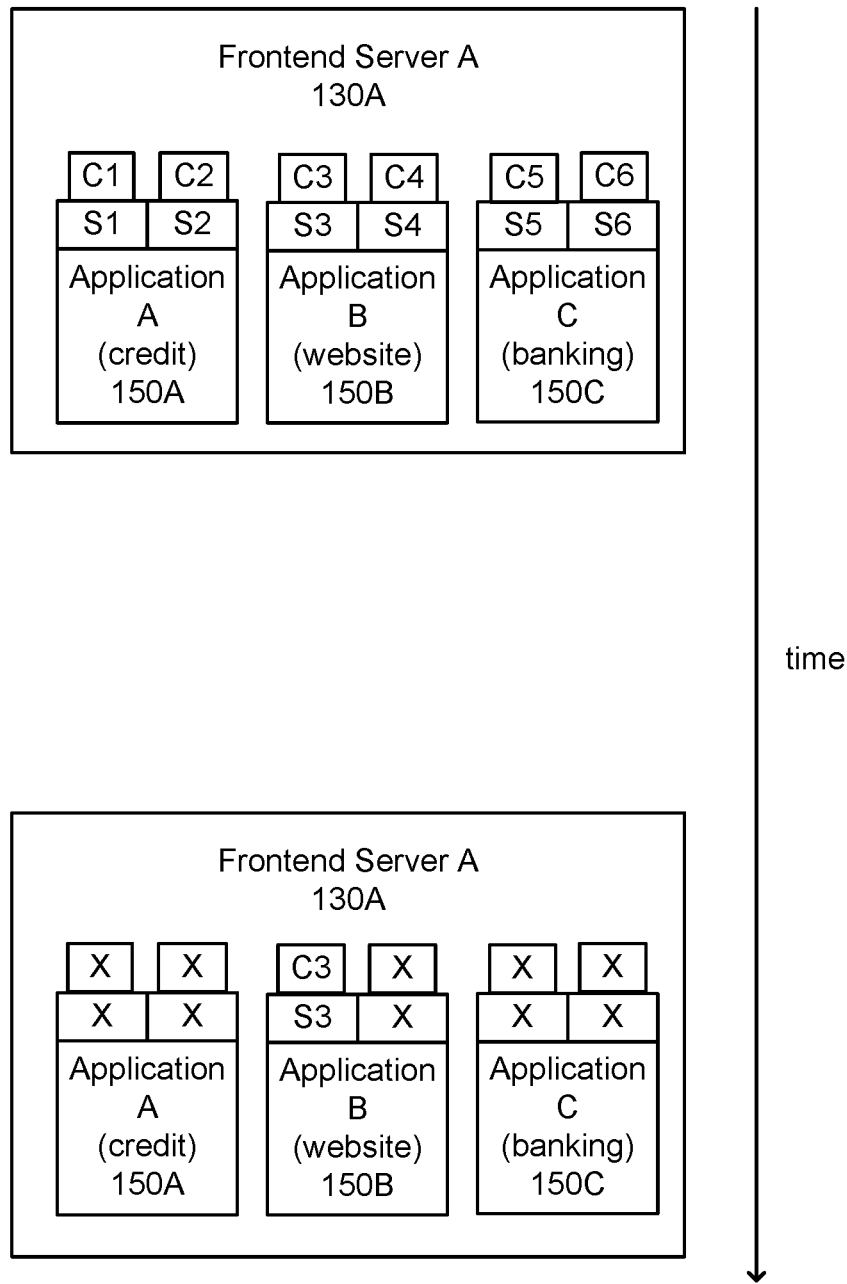
FIG. 4 is a diagram illustrating isolation of an application session/connection, according to an embodiment.
Figure 5:
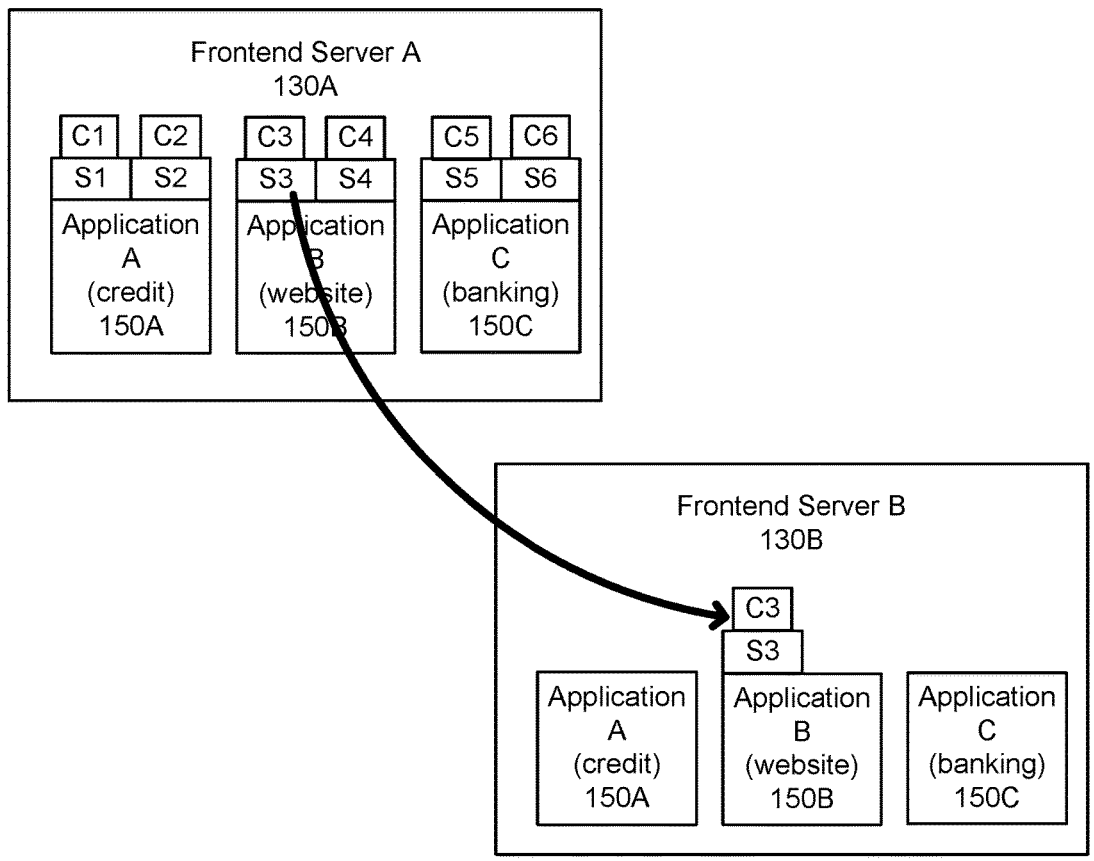
FIG. 5 is a diagram illustrating isolation of an application session/connection, according to another embodiment.

FIG. 4 is a diagram illustrating isolation of an application session, according to an embodiment. FIG. 5 is a diagram illustrating isolation of an application session, according to another embodiment. FIGS. 4 and 5 both illustrate the session/connection isolation security action from stage 7 of FIG. 2.

The session/connection isolation of FIG. 4 occurs by maintaining the high risk session/connection on the original server and allowing other sessions/connections established with the server 130A to complete while preventing any new sessions/connections from being established with applications 150 of that server 130A. Initially, there are six sessions S1-S6 established with the applications 150, and corresponding connections C1-C6. It is then determined that session S3 has been open for an unusually long period of time and should be isolated. To isolate session S3, sessions S1, S2, S4, S5 and S6 are permitted to complete. However, no new sessions are allowed to be established with server 130A. Eventually session S3 is the only session that is established with the applications 150 of server 130A, thereby isolating session S3 and connection C3.

Alternatively, to isolate high risk session S3, the other sessions (S1, S2, S4, S5, S6) can be moved from frontend server 130A to anther frontend server 130B to be protected against the data being compromised by a higher risk session S3 or connection. The higher risk session time extends beyond what is normally allowed and further security actions are taken against the sessions: analytics are processed against it, packets recorded, deeper monitoring starts, the connection/session are terminated with full source data to trace and track what happened or was happening. Dynamic access control lists (ACLs) are put in place for the higher risk session S3 to be blocked from performing any type of broad search, scan, or download of larger datasets. Connections to databases 140 can also be removed or limited all depending on the risk factor of the session. An IP address associated with the session S3 can also be recorded, and the client 105 may be forced to reconnect. The second time the session S3 is established the session/connection manager module 152 is in full recording mode to record activities of the hacker session S3. The hacker session S3 can be also be manipulated to show bogus data in order to trick a hacker in falling into thinking he has found data when he really hasn't. The backend databases 140 can be also be real or replaced with fake databases The session/connection isolation of FIG. 5 occurs by moving a session/connection between servers. Initially, there are six sessions S1-S6 and corresponding connections C1-C6 established with the applications 150 on frontend server A 130A. It is then determined that session S3 has been open for an unusually long period of time and should be isolated. To isolate session S3, session S3 and connection C3 are moved from frontend server A 130A to a different frontend server B 130B. The remaining sessions S1, S2, S4, S5 and S6 and connections C1, C2, C4, C5 and C6 are unaffected and remain on frontend server 130A.

As shown in FIG. 5, depending on the time of a session, the state of a session S3 and connection C3 can be moved to another server B 130B by doing a session hop or mirror. Upstream devices (e.g. router 115, firewall 120, load balancer 125) are also informed of the move. This allows for full session/connection migration without disconnecting the users session/connection or the user detecting a full state move took place. If a hacker has been connected to the frontend server 130A in this case and uploaded a remote script to compromise the server 130A, the session/connection hop will leave the changed application bits on the previous server 130A and the hackers session/connection will or could be prevented from functioning. A session/connection hop or failover can start generating alerts based on the hop and also have multi levels of state change.

Additionally, the frontend server B 130B may be a specialized security server. The specialized security server includes the ability to record every session/connection packet in real time and enable playback of the packets for analyzing how a hacker got into the system, as described above.

Figure 6:
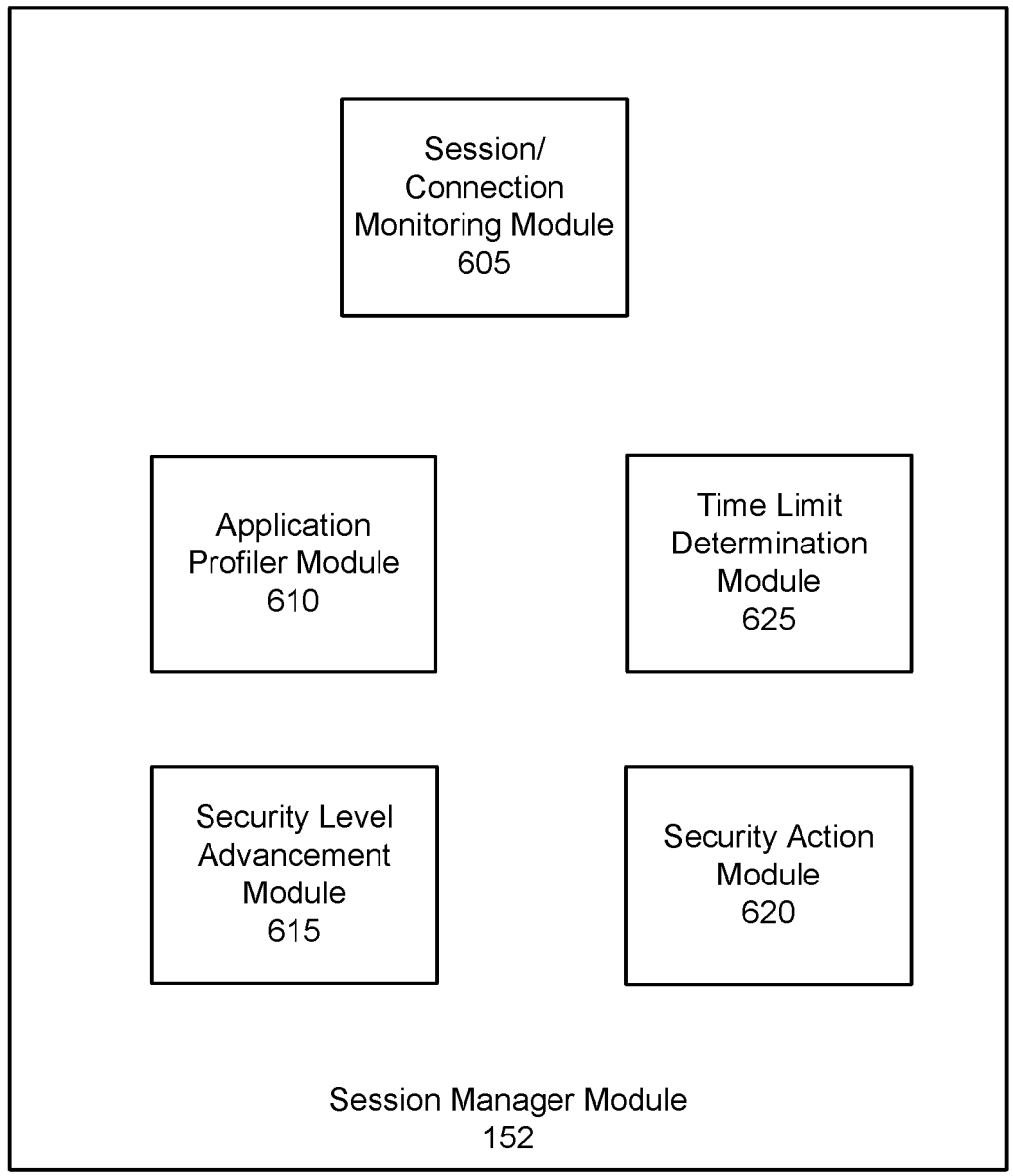
FIG. 6 is block diagram of a session/connection manager module from FIG. 1, according to an embodiment.

FIG. 6 is block diagram of a session/connection manager module 152 from FIG. 1, according to an embodiment. The session/connection manager module 152 includes a session/connection monitoring module 605, an application profiler module 610, a security level advancement module 615, a security action module 620 and a time limit determination module 625. In one embodiment, each module is implemented as software instructions stored on a computer readable medium.

The session/connection monitoring module 605 monitors applications 150 or network traffic or to detect when new application sessions/connections are established between any of the clients 105 and any of the applications 150. Once a new application session/connection is detected, the session/connection monitoring module 605 maintains a session/connection counter for the session/connection that indicates the duration of the session. A separate session/connection counter is maintained for each session/connection so that the duration of the sessions/connections can be separately tracked. At any given time the session/connection monitoring module 605 may be monitoring multiple sessions/connections for multiple applications 150. The session/connection monitoring module 605 can also identify the type of application 150 for which the application session/connection is established.

The application profiler module 610 implements a learning process to capture time durations of sessions/connections and to generate session/connection duration data for the application security profiles 154. In one embodiment, the application profiler module 610 captures the session/connection durations for the sessions/connections of an application 150. The session/connection durations are processed to generate session/connection duration data for the application 150. Examples of session/connection duration data include: (1) the shortest observed duration of the application sessions/connections (2) the highest observed duration of the application sessions/connections (3) the average observed duration of the application sessions/connections (4) the actual durations of the application sessions/connections, and any other relevant duration data. The session/connection duration data is then stored into an application security profile for the application 150. The process is repeated for different applications 150 so that each application 150 has its own unique application security profile.

The application profiler module 610 can also capture hack state information indicating whether a session/connection is considered hacked or not, which is stored into the application security profiles in association with the session/connection durations. A session/connection is considered hacked, for example, if a hacker has been triggering honeypots within the system or other security sensors have been triggered.

Time limit determination module 625 accesses the session/connection duration data in the application security profiles and uses the data to determine security time limits separating one security tier from the next security tier. The security time limits for an application are derived from the session/connection duration data for that application only. Thus, the security time limits for Application A 150A, the security time limits for Application B 150B, and the security time limits for Application C 150C will all be different.

The security time limits can be derived from the previously captured session/connection duration data using predetermined mathematical formulas. The security time limits for sessions are computed from session duration data, and the security time limits for connections are computed from connection duration data. For example, the security time limits for sessions of an application can be computed as multiples (e.g., 2x, 6x, 8x, 10x) of the average duration of the application's sessions. As another example, the time limits for sessions of an application can computed as multiples of the longest observed session duration (e.g. 1x, 2x, 3x, 4x) of the application's sessions. Each type of application 150 will thus have security time limits that best reflects the session/connection characteristics of that particular application.

The time limit determination module 620 can also determine time limits that separate one security stage from another security stage using a similar process. The hack state information may further be used to learn how durations of normal sessions/durations differ from hacked sessions/connections, which in turn is used in setting of the security time limits.

The security level advancement module 210 controls advancement from one security tier to the next. For a given session, the security level advancement module 210 compares the session/connection duration to the time limits established for that session. Once the comparison indicates that the session/connection duration has reached a corresponding time limit, the security level advancement module 210 advances the security tier to a higher security tier.

In one embodiment, the duration of an application session/connection is an overall duration that is measured from the beginning of an application session. The time limits for each security tier are also measured from the beginning of the application session. In another embodiment, the duration of an application session/connection can be a partial duration that represents the duration of an application session/connection within a single security tier. The time limits can also be maximum time limits of individual security tiers.

The security action module 620 executes or initiates various security actions to secure the frontend servers 130, backend servers 135 and database 140 against hacks by malicious sessions. As previously explained, examples of security actions are IP lookups, activating honeypot sensors, session/connection isolation, deep packet inspection, containing sessions, security alerting, session/connection tracing and session/connection recording. Different security actions are performed in each security tier and are triggered by the duration of the session/connection reaching the time limits. In some embodiments, one or more of the security actions can be performed on encrypted sessions data.

In one embodiment, the security action module 620 can initiate a security action by sending a security initiation request to an upstream or downstream device, which then causes the other device to execute the security action. For example, the router 115, firewall 120, load balancer 120, or backend server 135 may include functionality to perform security actions, which is activated by the security action module 620. The security action module 620 can also receive communications from the other devices with results of the security actions.

Figure 7:
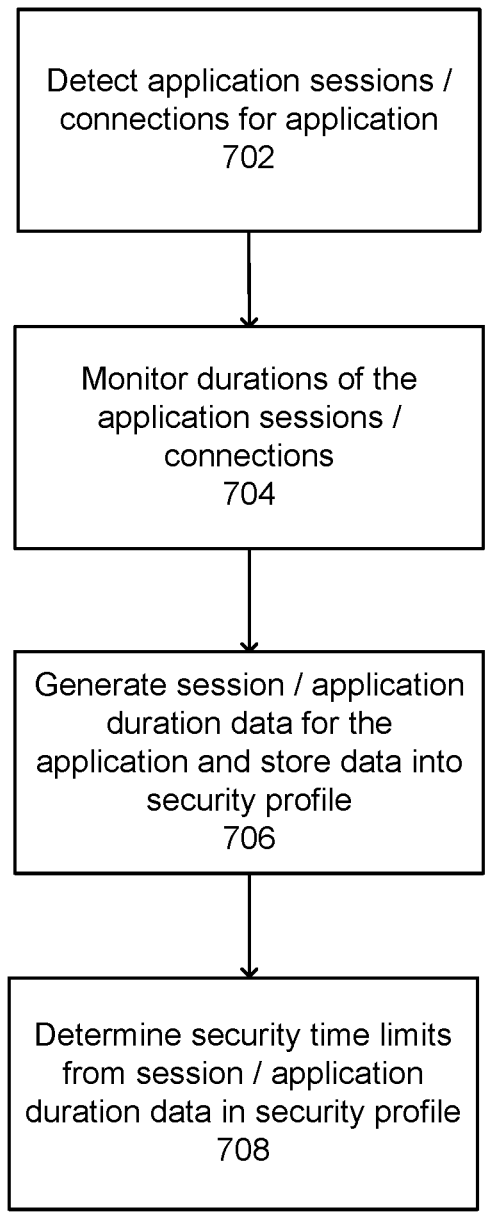
FIG. 7 is a flowchart of a method for profiling sessions/connections for an application and learning of time limits, according to an embodiment.

FIG. 7 is a flowchart of a method for profiling application sessions, according to an embodiment. The flowchart can represent operations of the session/connection manager module 152. In some embodiments the steps of the flowchart may be performed in a different order than that shown in the figure.

In step 702, application sessions/connections for an application are detected. In step 704, the durations of the sessions/connections are monitored and captured. In step 706, session/connection duration data is generated from the captured session/connection durations. The session/connection duration data is stored into an application security profile in association with the application. In step 708, once sufficient session/connection duration data is available for the previously established sessions/connections, the security profile is accessed and security time limits are determined from the session/connection duration data in the security profile. The security time limits indicate the time boundaries between one security tier and another security tier.

The process in FIG. 7 is repeated several times for different applications (e.g. 150A, 150B, 150C) to generate a large set of application security profiles and different security time limits for each application that divide security for the application into different security tiers representing increasing levels of security risk.

Figure 8:
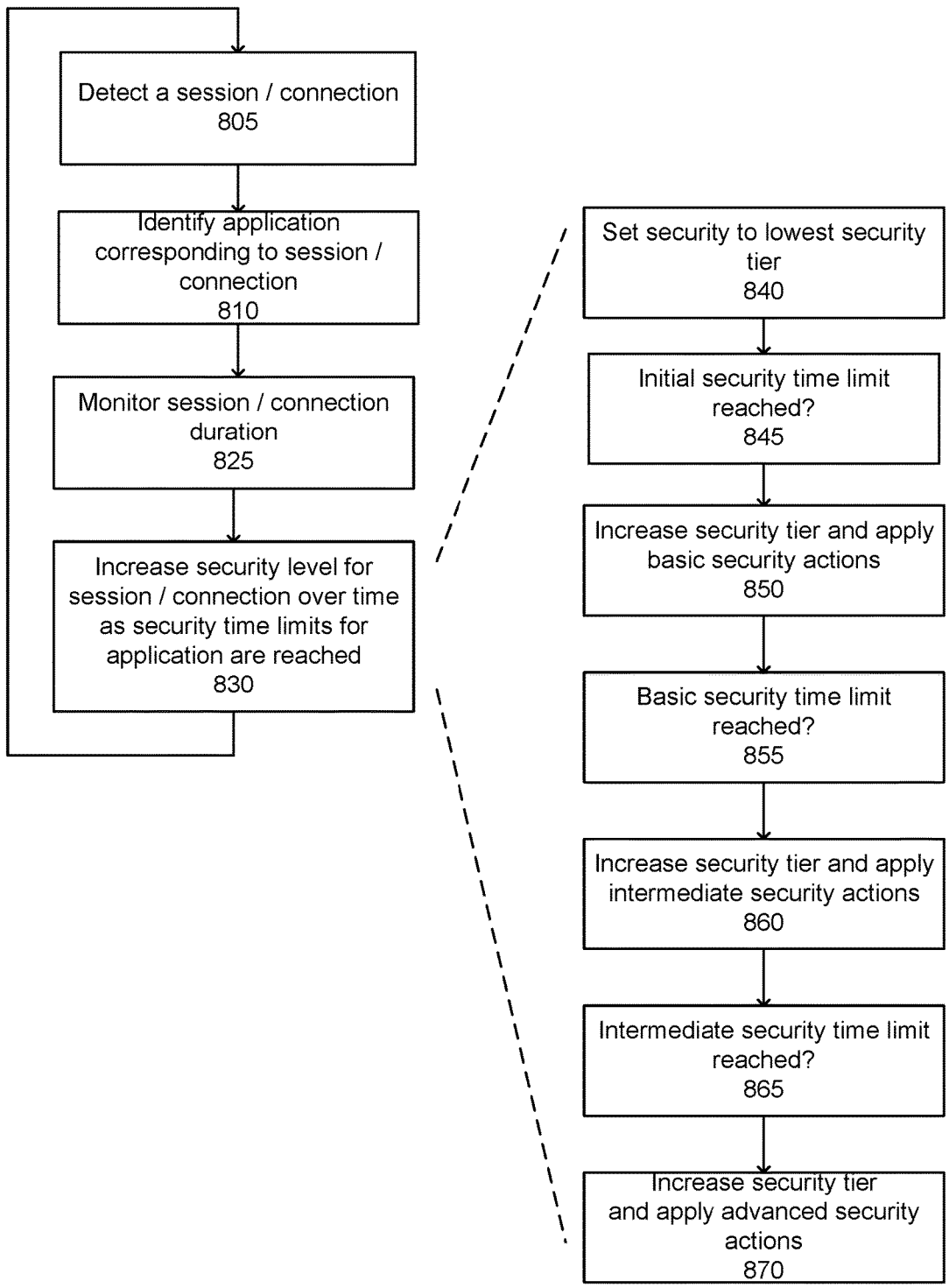
FIG. 8 is a flowchart of a method for session/connection splitting security, according to an embodiment.

FIG. 8 is a flowchart of a method for session/connection splitting security, according to an embodiment. The flowchart can represent operations of the session/connection manager module 152 that typically occur after the flowchart of FIG. 7. In some embodiments the steps of the flowchart may be performed in a different order than that shown in the figure.

In step 805, an application session/connection established between a client 105 and application 150 is detected. In step 810, an application 150 corresponding to the application session/connection is identified. In step 825, the duration of the application session/connection is monitored. In step 830, the security level for the application session/connection is increased over time as the duration of the application session/connection reaches the security time limits determined for that application. Step 830 can be divided into several substeps 840-870.

In step 840, security is initially set to the lowest security tier, such as security tier A 202. During the lowest security tier A 202, a minimal number of security actions defined by a minimal set of security rules are performed.

In step 845, the session/connection duration is compared to an initial security time limit. In step 850, if the session/connection duration has reached the initial security time limit, security is increased to security tier B 204. During security tier B 204, basic security actions defined by a set of basic security rules are triggered and applied to the application session/connection. The basic security actions are applied by executing the basic security actions against the application session/connection.

In step 855, the session/connection duration is compared to a basic security time limit. In step 860, if the session/connection duration has reached the basic security time limit, security is increased to security tier C 206. During security tier C 206, intermediate security actions defined by a set of intermediate security rules are triggered and applied to the application session/connection. The intermediate security actions are applied by executing the basic intermediate security actions against the application session/connection.

In step 865, the session/connection duration is compared to an intermediate security time limit. In step 870, if the session/connection duration has reached the intermediate security time limit, security is increased to security tier D 208. During security tier D 208, advanced security actions defined by a set of advanced security rules are triggered and applied to the application session/connection. The advanced security actions are applied by executing advanced security actions against the application session/connection.

The process shown in FIG. 8 can be repeated for each application session/connection established between any of the clients 105 and any of the applications 150A, 150B or 150C, thereby providing time based security against hackers that is tailored to each application 150A, 150B or 150C.

Embodiments of the present disclosure may have the following advantages. Profiling application sessions/connections enables more intelligence for making better security decisions. Correlating application sessions/connections to security tiers can allow for higher enlightened security and decision making based. Increased analytics of the correlated data allows for timely reactions and containment of an issue before it turns into a full network compromise. Profiling an application for security integration with all the devices in the datacenter improves on containing hackers control in a network. Time staged sessions/connections open new levels of security analysis. Deeper analytics can be done as hackers have to repeat their hacks over and over to get access to a platform. The more a system is hacked, the greater the opportunity for sensors to pick up a hole in the application, OS or protocol that can be plugged.

Figure 9:
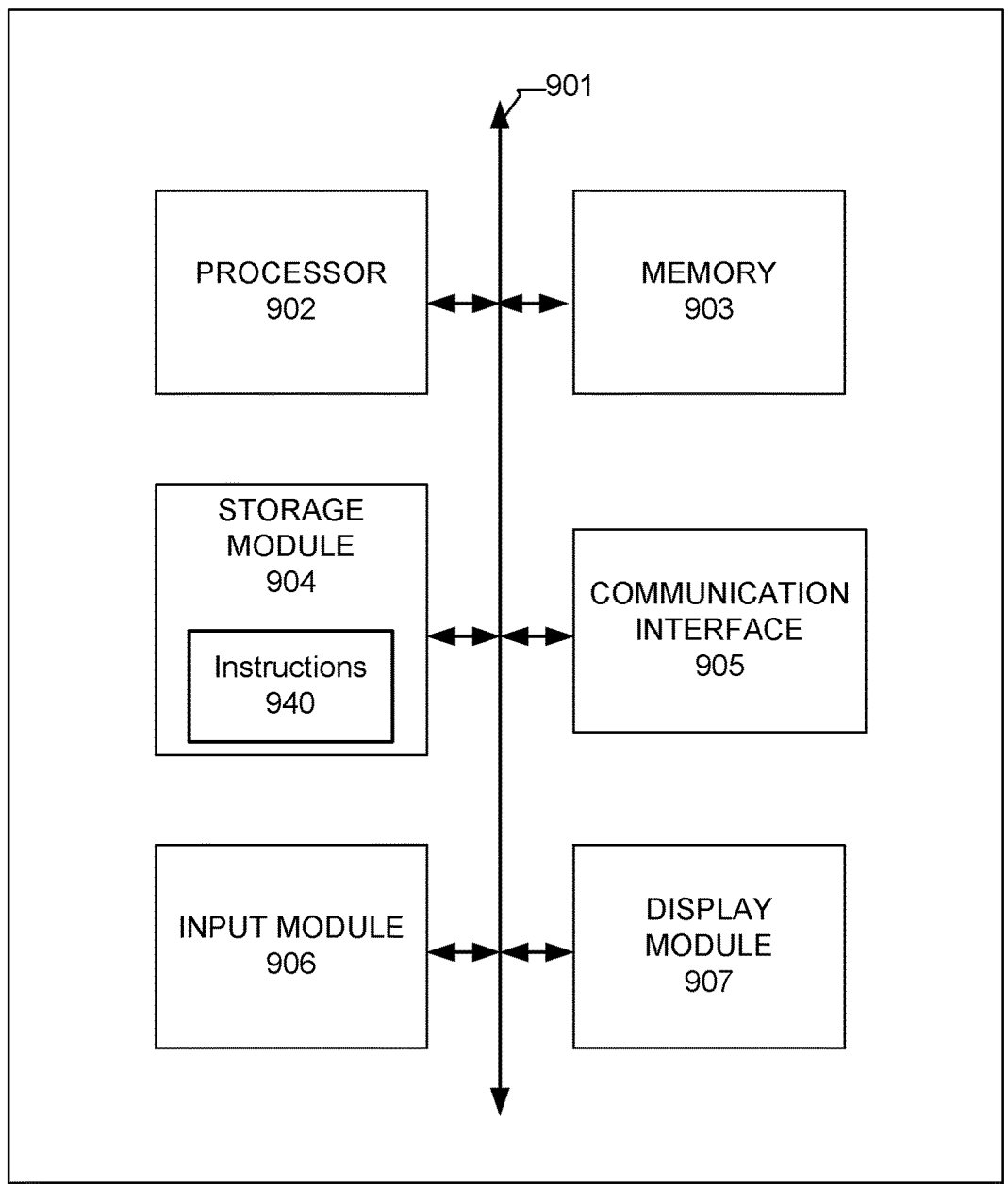
FIG. 9 illustrates the hardware architecture of a computing device, according to an embodiment.

FIG. 9 illustrates the hardware architecture of a computing device, such as a firewall 115, router 120, load balancer 125, client device 105, frontend server 130, or backend server 135, according to one embodiment. In one embodiment, the computing device is a computer including components such as a processor 902, a memory 903, a storage module 904, an input module (e.g., keyboard, mouse, and the like) 906, a display module 907 and a communication interface 905, exchanging data and control signals with one another through a bus 901. The storage module 904 is implemented as one or more non-transitory computer readable storage media (e.g., hard disk or solid state drive), and stores software instructions 940 (e.g. modules) that are executed by the processor 902 in conjunction with the memory 903 to implement the security features described herein. An example of software instructions can be software code or program code. Operating system software and other application software may also be stored in the storage module 904 to run on the processor 902.

Upon reading this disclosure, those of skill in the art may appreciate still additional alternative designs for session/connection splitting security. Thus, while particular embodiments and applications of the present disclosure have been illustrated and described, it is to be understood that the disclosure is not limited to the precise construction and components disclosed herein. Various modifications, changes and variations which may be apparent to those skilled in the art may be made in the arrangement, operation and details of the method and apparatus of the present disclosure herein without departing from the spirit and scope of the disclosure as defined in the appended claims.

What is claimed is:

1. A computer implemented method to secure against unauthorized access to resources during application sessions, comprising:
    detecting a first application session established between a first client and a first application of a first host device, the first application associated with a first plurality of security time limits that divide security for the first application into a plurality of security tiers;
    monitoring an active session duration of the first application session established between the first client and the first application;
    executing one or more first security actions against the first application session responsive to the active session duration of the first application session reaching a security time limit of the first plurality of security time limits, wherein the one or more first security actions are specified in a first security tier of the plurality of security tiers, and wherein the one or more first security actions comprise one or more of Internet Protocol (IP) lookups, deep packet inspection, malformed packet detection, or enabling security sensors; and
    executing one or more second security actions against the first application session responsive to the active session duration of the first application session reaching another security time limit of the first plurality of security time limits, wherein the one or more second security actions are specified in a second security tier of the plurality of security tiers, and wherein the one or more second security actions comprise one or more of IP lookups, deep packet inspection, malformed packet detection, or enabling security sensors.

2. The method of claim 1, further comprising:
    monitoring active session durations of a plurality of application sessions corresponding to the first application to generate session duration data; and
    determining the first plurality of security time limits based on the session duration data for the plurality of application sessions.

3. The method of claim 1, further comprising:
    detecting a second application session established between a second client and a second application of the first host device, the second application associated with a second plurality of security time limits that divide security for the application into security tiers;
    monitoring an active session duration of the second application session established between the second client and the second application;
    executing the one or more first security actions against t-e the second application session responsive to the active session duration of the second application session reaching a security time limit of the second plurality of security time limits; and
    executing the one or more second security actions against the second application session responsive to the active session duration of the second application session reaching another security time limit of the second plurality of security time limits.

4. The method of claim 1, wherein one of the first security actions or the second security actions further comprise isolating the first application session from other application sessions associated with the first host device.

5. The method of claim 4, wherein the isolating of the first application session comprises moving the first application session to a second host device.

6. The method of claim 4, wherein the isolating of the first application session comprises maintaining the first application session on the first host device and preventing the other application sessions from being established with the first host device.

7. The method of claim 1, wherein the first application session is a session of an Open Systems Interconnect (OSI) session layer.

8. The method of claim 1, wherein each of the one or more first security actions is associated with a stage time limit, the sum of the stage time limits associated with each of the one or more first security actions equal to the security time limit of the first plurality of security time limits, and wherein a security action of the one or more first security actions is executed responsive to the active session duration of the first application session reaching an associated stage time limit of the security action of the one or more first security actions.

9. A system for securing against unauthorized access to resources during connections, comprising:
    one or more processors;
    a non-transitory computer readable medium storing instructions, the instructions when executed by the one or more processors, cause the one or more processors to perform operations of:
        detecting a first application session established between a first client and a first application of a first host device, the first application associated with a first plurality of security time limits that divide security for the first application into a plurality of security tiers;

monitoring an active session duration of the first application session established between the first client and the first application;

executing one or more first security actions against the first application session responsive to the active session duration of the first application session reaching a security time limit of the first plurality of security time limits, wherein the one or more first security actions are specified in a first security tier of the plurality of security tiers, and wherein the one or more first security actions comprise one or more of Internet Protocol (IP) lookups, deep packet inspection, malformed packet detection, or enabling security sensors; and executing one or more second security actions against the first application session responsive to the active session duration of the first application session reaching another security time limit of the first plurality of security time limits, wherein the one or more second security actions are specified in a second security tier of the plurality of security tiers, and wherein the one or more second security actions comprise one or more of IP lookups, deep packet inspection, malformed packet detection, or enabling security sensors.

10. The system of claim 9, the operations further comprising operations of:

monitoring active session durations of a plurality of connections established for sessions corresponding to the first application to generate connection duration data; and determining the first plurality of security time limits based on the connection duration data for the plurality of connections.

11. The system of claim 9, the operations further comprising operations of:

detecting a second application session established between a second client and a second application of the first host device, the second application associated with a second plurality of security time limits that divide security for the second application into security tiers;

monitoring an active session duration of the second application session;

executing the one or more first security actions against the second application session responsive to the active session duration of the second application session reaching a security time limit of the second plurality of security time limits; and executing the one or more second security actions against the second application session responsive to the active session duration of the second application session reaching another security time limit of the second plurality of security time limits.

12. The system of claim 9, wherein one of the second security actions comprise: IP lookups, deep packet inspection, malformed packet detection, or enabling honeypot security sensors.

13. The system of claim 9, wherein one of the first security actions or the second security actions further comprise isolating the first application session from other sessions associated with the first host device.

14. The system of claim 13, wherein the isolating of the first application session comprises moving the first application session to a second host device.

15. The system of claim 13, wherein the isolating of the first application session comprises maintaining the first application session on the first host device and preventing the other sessions from being established with the first host device.

16. The system of claim 9, wherein the first application session includes a TCP connection.

17. A non-transitory computer readable medium storing instructions to secure against unauthorized access to resources during connections, the instructions when executed by at least one processor cause the at least one processor to perform operations of:

detecting a first application session established between a first client and a first application of a first host device, the first application associated with a first plurality of security time limits that divide security for the first application into a plurality of security tiers;

monitoring an active session duration of the first application session established between the first client and the first application;

executing one or more first security actions against the first application session responsive to the active session duration of the first application session reaching a security time limit of the first plurality of security time limits, wherein the one or more first security actions are specified in a first security tier of the plurality of security tiers, and wherein the one or more first security actions comprise one or more of Internet Protocol (IP) lookups, deep packet inspection, malformed packet detection, or enabling security sensors; and executing one or more second security actions against the first application session responsive to the active session duration of the first application session reaching another security time limit of the first plurality of security time limits, wherein the one or more second security actions are specified in a second security tier of the plurality of security tiers, and wherein the one or more second security actions comprise one or more of IP lookups, deep packet inspection, malformed packet detection, or enabling security sensors.

18. The non-transitory computer readable medium of claim 17, the operations further comprising operations of:

monitoring active session durations of a plurality of connections established for sessions corresponding to the first application to generate connection duration data; and determining the first plurality of security time limits based on the connection duration data for the plurality of connections.

* * * * *